Sept. 6, 1960  H. E. METCALF  2,951,381
ELECTROMAGNETIC AXIAL AND ROTARY ACTUATOR
Filed May 27, 1957
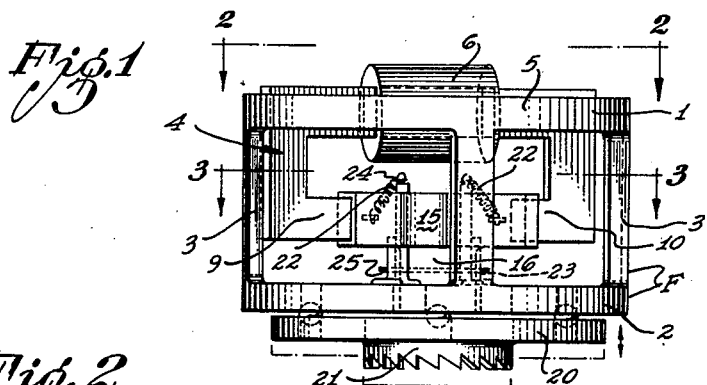
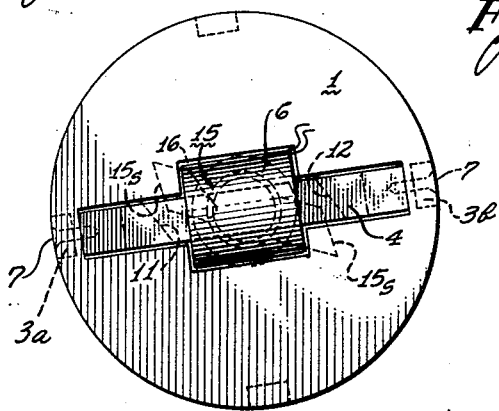
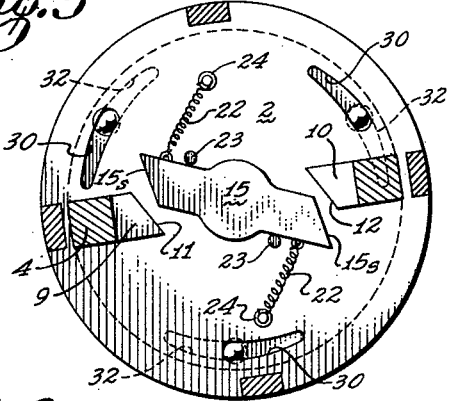
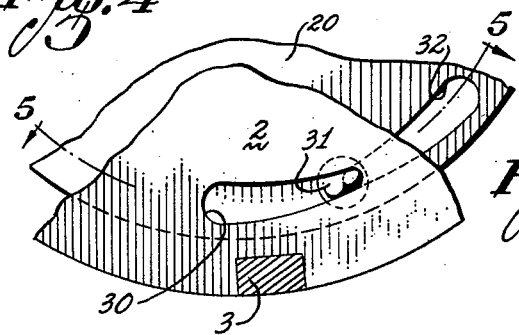
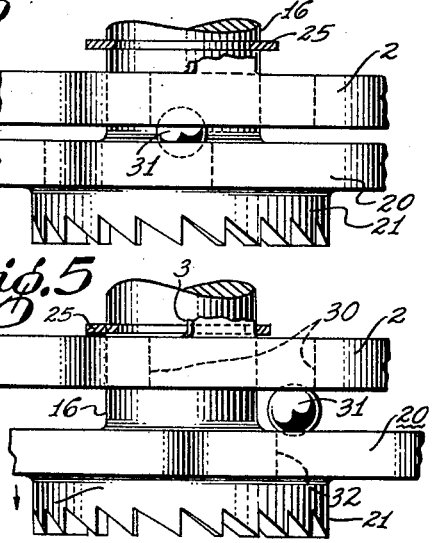
INVENTOR:
Herbert E. Metcalf

United States Patent Office 2,951,381
Patented Sept. 6, 1960

2,951,381

ELECTROMAGNETIC AXIAL AND ROTARY ACTUATOR

Herbert E. Metcalf, P.O. Box 35, Malibu, Calif.; Carol R. Metcalf, administratrix of said Herbert E. Metcalf, deceased Filed May 27, 1957, Ser. No. 661,637

5 Claims. (Cl. 74—89)

My invention relates to electromagnetic actuated means for producing a combined axial and rotary motion, and more particularly to a means for converting a rotary movement into axial motion when the rotary movement is created by electromagnetic force.

A prime object of the present invention is to provide a simple and efficient electrically actuated converter of rotary into axial motion.

Another object of my invention is to provide a means and method of converting the rotation of an electromagnetic armature into a combined rotational and axial movement.

A still further object of the present invention is to provide a compact and easily assembled electromagnetic actuator capable of reliably clutching and turning a load.

Briefly stated, my invention includes a shaft carrying an armature capable of rotation by the energization of a magnetic circuit by a winding. The shaft is connected to turn a rotatable member positioned adjacent a stationary member, these two members being coupled by balls operating in races shaped and directed to cause the rotary member to move axially as the member is turned, thereby producing a combined rotary and axial movement. In one use, for example, the initial axial movement can be used to engage a clutch to connect a load to the shaft, the rotary movement thereafter turning the load. A spring is used to return the rotatable member to its original position after each power stroke. As for the balls and ball races, I prefer to use the diverging edge slot and ball assemblies shown described and claimed in my application Serial No. 623,082 filed November 19, 1956. However, the ball and slant surface races as shown in the U.S. Urban Patent 1,585,140 can also be used.

My invention will be more fully understood by reference to the following detailed description of one preferred form of the invention shown in the appended drawings in which:

Figure 1 is a side view in elevation of a solenoid operated actuator.

Figure 2 is a top plan view taken as indicated by the line 2—2 in Figure 1.

Figure 3 is a view partly in elevation and partly in section taken as indicated by the line 3—3 in Figure 1.

Figure 4 is a fragmentary enlarged plan view of one ball and diverging edge slot assembly as used in the device of Figure 1, with the discs in maximum spaced position.

Figure 5 is a fragmentary side view of one ball and slot assembly as used in the device of Figure 1, with minimum disc spacing.

Figure 6 is a fragmentary side view of the ball and slot assembly in the position of Figure 4 taken as indicated by the line 6—6 in that figure.

Referring first to Figure 1 for the general structure of the device illustrated, a frame F is provided comprising an end disc 1 and a spaced stationary disc 2 connected by four side spacers 3.

End disc 1 is cut away to receive a U-shaped structure 4 of magnetic material the bottom leg 5 of which carries an energizing coil 6. The magnetic structure 4 is held in place by screws 7 from two opposed side spacers 3a and 3b, as best shown in Figure 2.

The open end of the U-shaped magnetic structure terminates in two inwardly projecting pole pieces 9 and 10 having slant surfaces 11 and 12, respectively, thereon, as best shown in Figure 3.

A rotatable armature 15 is mounted on a central shaft 16 extending centrally through stationary disc 2 and terminating outside the latter disc in a rotatable disc 20 adjacent and parallel to stationary disc 2. Rotatable disc 20 carries a jaw clutch member 21 to engage a load to be rotated.

The ends of armature 15 terminate in slanted armature surfaces 15s complementary to slant surfaces 11 and 12 on the pole pieces 9 and 10 respectively, so that when coil 6 is energized the magnetic flux will cause armature 15 to assume a position closing the magnetic circuit of the structure 5.

Armature 15, however, is maintained in a position rotated away by a predetermined angle from the closed circuit position by springs 22 holding armature 15 against stops 23 erected from stationary disc 2.

Springs 22 connect the armature arms with spring posts 24 also projected from stationary disc 2. The insertions of springs 22 are such that the spring forces have a component tending to force rotatable disc 20 toward stationary disc 2, as well as a component tending to rotate armature 15 away from its closed magnetic circuit position. A split ring 25 inserted in shaft 16 inside of stationary disc 2 limits the outward travel of shaft 16 and its attached disc and jaw clutch element, as best shown in Figures 5 and 6.

Stationary disc 2 and rotatable disc 20 are coupled by a plurality of ball and race assemblies wherein opposed pairs of races with a ball between each pair are shaped and directed to force rotatable disc 20 away from stationary disc 2 when disc 20 is rotated, thereby causing shaft 16 and its attached elements armature 15, rotatable disc 20, and jaw clutch member 21 to move axially as well. A highly efficient and preferred type of ball and race assembly is the ball and divergent edge slot race shown, described and claimed in my prior application cited above. As applied to the present structure the stationary disc 2 is provided with three uniformly spaced divergent edge slots 30, these slots being proportioned to have a ball 31 travel thereover along a circular path centered on the axis of shaft 16. The ball is somewhat larger than the large end of a slot 30 so that ball 31 travels only on the edges of the slot. Rotatable disc 20 is similarly provided with divergent edge slots 32 similar to slots 30 and opposed to the latter, the ball paths being circularly parallel. However, slots 32 have their big ends reversed in position with relation to slots 30 so that the balls will roll on the four edges only of each slot pair from one end position where the ball is in both big ends, to the other end position where the ball is in both small ends of each slot pair. When the balls are in the big ends, the discs 2 and 20 are relatively close together as shown in Figures 1, 3, 4 and 6, and when the balls are in the small ends of the slot pairs, the discs are their maximum distance apart as shown in Figure 5.

The structure is assembled so that with the armature held in full open position by springs 22 as best shown in Figure 3, and the discs 2 and 20 are closest together as best shown in Figures 1 and 6.

In operation, coil 6 is energized, and armature 15 is thereby rotated to closed magnetic path position. This rotation rolls the balls 31 in their races and forces the disc 20 and jaw clutch member 21 axially. This axial movement can be used to engage the jaw clutch member 21 with a similar corresponding clutch member (not shown) on a load, and the remaining rotary movement will then rotate the load. After the electrical coil pulse is removed, springs 22 will return the armature and disc 20 to the original positions, ready for the next pulse. Thus a rotary and axial motion is produced. The structure is thus suitable for use in stepper motors, for example, of the type shown in the U.S. patent to White No. 2,706,259.

The relationship between rotational and axial travel can readily be adjusted by adjusting the armature rotational travel and the depth of the ball penetration into the slots.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. A solenoid actuator comprising an angularly oscillatable armature, a magnetic structure having poles positioned to rotate said armature through a predetermined angular displacement about an axis, a solenoid winding on said magnetic structure for energization thereof to cause said armature to rotate, means limiting the stroke amplitude of said armature to said predetermined angular displacement, a shaft coaxially connected with said armature for rotation therewith, a rotatable disc coaxially attached to said shaft, an adjacent and parallel stationary disc, and coupling means between said discs comprising a plurality of pairs of opposed ball races, balls between said races and contacting said races, said races being shaped and directed to force said shaft, rotatable member and armature in an axial direction due to, and while, being rotated by magnetic force acting to rotate said armature.

2. A solenoid actuator comprising a rotatable armature, a magnetic structure having poles positioned to rotate said armature around an axis, a solenoid winding on said magnetic structure for energization thereof to cause said armature to rotate, a shaft coaxially connected with said armature for rotation therewith, a rotatable disc co-axially attached to said shaft, an adjacent and parallel stationary disc, and coupling means between said discs comprising a plurality of pairs of opposed ball races, balls between said races and contacting said races, said races being shaped and directed to force said shaft, rotatable member and armature in an axial direction due to, and while, being rotated by magnetic force acting to rotate said armature, and elastic means operating on said rotating members to return said rotating members to their original positions.

3. A solenoid actuator comprising a rotatable armature, a magnetic structure having poles positioned to rotate said armature around an axis, a solenoid winding on said magnetic structure for energization thereof to cause said armature to rotate, a shaft coaxially connected with said armature for rotation therewith, a rotatable disc coaxially attached to said shaft, an adjacent and parallel stationary disc, and coupling means between said discs comprising a plurality of pairs of opposed ball races, balls between said races and contacting said races, said races being shaped and directed to force said shaft, rotatable member and armature in an axial direction due to, and while, being rotated by magnetic force acting to rotate said armature, clutching means on an end of said shaft.

4. A solenoid actuator comprising a rotatable armature, a magnetic structure having poles positioned to rotate said armature around an axis, a solenoid winding on said magnetic structure for energization thereof to cause said armature to rotate, a shaft coaxially connected with said armature for rotation therewith, a rotatable disc coaxially attached to said shaft, an adjacent and parallel stationary disc, and coupling means between said discs comprising a plurality of pairs of opposed ball races, balls between said races and contacting said races, said races being shaped and directed to force said shaft, rotatable member and armature in an axial direction due to, and while, being rotated by magnetic force acting to rotate said armature, jaw clutch member on an end of said shaft.

5. In a rotary actuator, a stationary member, a rotatable member positioned adjacent and parallel to said stationary member, a plurality of opposed pairs of ball races on said members, a ball in rolling engagement with each of the races of each pair, said races being shaped and directed to cause said rotatable element to move axially when said rotatable member is rotated, electromagnet means including a limitedly oscillative armature connected to rotate said rotatable member, means limiting the stroke amplitude of said armature to a predetermined angle, and an electromagnet having poles positioned to create a field which rotates said armature, and load operating means connected to said rotatable member.

References Cited in the file of this patent

UNITED STATES PATENTS

| 1,041,569 | Bade | Oct. 15, 1912 |
| 2,430,940 | Leland | Nov. 18, 1947 |
| 2,566,571 | Leland | Sept. 4, 1951 |
| 2,706,259 | White | Apr. 12, 1955 |
| 2,780,106 | Lovequist | Feb. 5, 1957 |
| 2,820,370 | Dolesh et al. | Jan. 21, 1958 |